United States Patent [19]

Goodwin et al.

[11] 4,063,084

[45] Dec. 13, 1977

[54] DUAL CHANNEL OPTICAL HOMODYNE RECEIVER

[75] Inventors: Frank E. Goodwin, Malibu; Thomas A. Nussmeier, Thousand Oaks, both of Calif.

[73] Assignee: Hughes Aircraft Company, Culver City, Calif.

[21] Appl. No.: 706,723

[22] Filed: July 19, 1976

[51] Int. Cl.$^2$ .............................................. H04B 9/00
[52] U.S. Cl. ................................................... 250/199
[58] Field of Search ........................................ 250/199

[56] References Cited
U.S. PATENT DOCUMENTS

| | | | |
|---|---|---|---|
| 3,666,956 | 5/1972 | von Willisen | 250/199 |
| 3,939,341 | 2/1976 | Graves | 250/199 |
| 3,971,930 | 7/1976 | Fitzmaurice et al. | 250/199 |

Primary Examiner—Richard Murray
Attorney, Agent, or Firm—D. O. Dennison; W. H. MacAllister

[57] ABSTRACT

An improved homodyne receiver for use in wideband optical communications systems is disclosed. The receiver utilizes quadrature demodulation of the optical signal in the manner of a two-phase receiver. A beam-splitting/phase-splitting optical assembly is used to channelize the received and the local oscillator beams to a pair of optical detectors. Squaring amplifiers in the quadrature channels followed by a summing network provide an output signal which is proportional to the square of the modulation of the input signal. This receiver is especially well-suited to the reception of Pulse Code Modulated optical signals.

11 Claims, 5 Drawing Figures

DUAL CHANNEL OPTICAL HOMODYNE RECEIVER

FIELD OF THE INVENTION

This invention relates to wideband communication receivers and more specifically to homodyne receivers operable at wavelengths in the "optical" region.

DESCRIPTION OF THE PRIOR ART

In the past, many communications systems have been suggested which use the coherent output of a laser oscillator as the information carrier. The vast spectrum made available by laser communications is, of course, well known. At the optical wavelengths of lasers, which include not only the visible region but the infrared region as well, the generation of extremely narrow beams is highly conservative of the transmitted energy and at the same time provides a great deal of spatial security against undesired reception.

While the potential of wideband laser communications has been long recognized, the availability of components necessary to realize such systems has been limited. In recent years, however, a great number of improvements have made such systems practical. These improvements have included the development of highly reliable $CO_2$ lasers, the development of wideband optical modulators, the development of efficient wideband detectors, and the development of suitable optical components and subsystems.

Borrowing heavily from the radio frequency art, the receivers which have been proposed for use with such laser communications systems have generally operated on the so-called heterodyne principle. As is well known, in a heterodyne receiver, the incoming optical signal is mixed with the coherent output of a local oscillator to produce a difference or intermediate frequency generally at rf. This rf intermediate frequency is then processed using relatively straight-forward rf techniques.

While the advantages of receivers operating on the homodyne principle have been recognized at optical wavelengths for some time, a practical implementation of such a receiving system has only been recently available. In contrast to the heterodyne receiver, the homodyne receiver makes fuller, and therefore more efficient, use of the bandwidth of the optical detector. That is, for a given detector bandwidth, the homodyne receiver can accept modulation frequencies on the order of three or four times higher than those which the heterodyne receiver can accept. And, since the optical detector bandwidth is an important technical system constraint, homodyne detection offers a significant advantage in system performance over heterodyne detection.

It is, therefore, a general object of the present invention to provide a homodyne receiver operable at optical wavelengths.

One recently developed optical homodyne receiver is disclosed in the copending application of F. E. Goodwin and R. E. Graves entitled "Dual Channel Phase-Locked Optical Homodyne Receiver," Ser. No. 608,868, filed Aug. 29, 1975, now U.S. Pat. No. 3,970,838. As its title implies, the receiver of that invention employs phase-lock techniques to cause the laser local oscillator to track the optical input signal even in the presence of noise and unwanted frequency excursions.

It is another object of the present invention to provide an optical homodyne receiver which does not utilize a phase-locked laser local oscillator.

By way of review, homodyne detection represents a totally degenerate case of heterodyne detection in which the local oscillator of the receiver is substantially the same frequency as the received signal carrier. In other words, the homodyne receiver is much like a heterodyne receiver having an intermediate frequency centered about zero Hertz. In the case of the phase-locked receiver of the above-mentioned copending application, Ser. No. 608,868, the local oscillator is maintained precisely at the carrier frequency of the optical input signal.

Another prior art technique for achieving homodyne demodulation of optical signals is found in U.S. Pat. No. 3,694,656 which issued to H. B. Henning on Sept. 26, 1972. According to this technique the input signal (which is an optical signal "echoed" from a target) is linearly polarized in the same plane as the local oscillator signal. A combination of polarizers, mirrors and half-silvered mirrors are utilized to direct the local oscillator and returned signal beams to a pair of photodetectors. By utilizing this technique, however, a minimum of six or nine dB of signal is irretrievably lost from the optical path.

The signals in the dual channels of U.S. Pat. No. 3,694,656 represent the algebraic sum and difference of the signal and local oscillator components, respectively. After photodetection the two antiphase signals are then coupled to a difference amplifier, the output of which is proportional to the signal-local oscillator product. Although realizable, the inefficiencies of this technique, however, detract from its full usefulness in communications applications.

SUMMARY OF THE INVENTION

An alternative technique for implementing an optical homodyne receiver is disclosed herein. In accordance with the principals of the present invention, the input optical signal is split into two equal portions each of which is directed to an optical detector operating as a mixer. The output of a laser local oscillator is also split and applied in substantially equal portions to the inputs of the optical detectors. A combination beam-splitting beam-combining apparatus assures that the correct phase relationships exist between the signal and local oscillator components at the two optical detectors.

In the case of the present invention, the laser local oscillator is stabilized by conventional frequency stabilization means, and is not phase or frequency-locked to the input signal carrier as in the phase-locked optical homodyne receiver mentioned above. The outputs of the two optical detectors, which represent the in-phase and phase quadrature components of the signal are then squared in separate squaring amplifiers. The squared signal components are then summed and level detected. Conversion to the proper pulse code format can be achieved by means of optional signal processing electronics.

BRIEF DESCRIPTION OF THE DRAWINGS

In order that the invention may be clearly understood and readily carried into effect, it will now be described with reference by way of example to the accompanying drawings, wherein like reference numerals correspond to like structural elements and, in which.

DESCRIPTION OF THE PREFERRED EMBODIMENT

Figure 1:
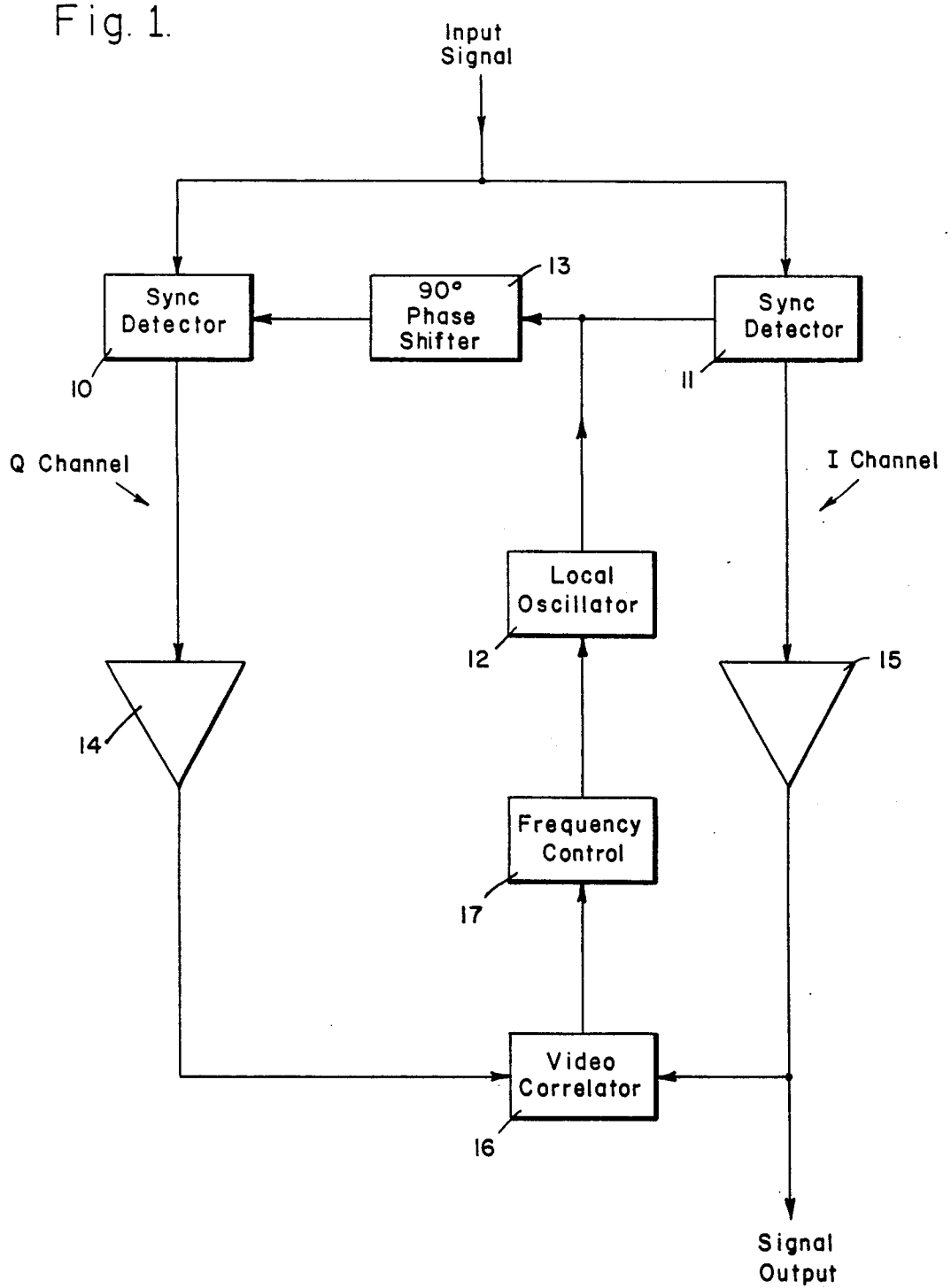
FIG. 1 is a block diagram of a simplified dual channel synchronous receiver useful in the understanding of the principles of the present invention.

In FIG. 1 there is shown a simplified block diagram of a dual-channel synchronous receiver useful in understanding of the principles of the present invention. Such receivers have been used for many years in the radio frequency region for the synchronous reception of suppressed-carried amplitude modulated signals. This receiver, generally referred to as a Costas receiver or Costas demodulator, is described in an article entitled "Synchronous Communications", by John P. Costas, *Proceedings of the IRE,* December 1956, on pages 1713-1718.

In the circuit of FIG. 1, an input signal, typically derived from a receiving antenna, is split into two substantially equal-amplitude components and coupled to first and second synchronous detectors 10 and 11 respectively. Although not shown in the above-cited article the usual Costas receiver employs at least one stage of radio frequency amplification in the signal path between the antenna and the synchronous detectors. In any event, the output of a controllable local oscillator 12 is coupled to a second input of synchronous detector 11. The output of local oscillator 12 is also coupled through a 90° phase shift network 13 to a second input of synchronous detector 10. The outputs of synchronous detectors 10 and 11 are coupled through respective amplifiers 14 and 15 to separate inputs of a video correlator 16.

The output of video correlator 16 is, in turn, coupled to a frequency control circuit 17 which controls the phase and frequency of local oscillator 12. The output of the synchronous receiver is obtained from the output of video amplifier 15 and is coupled to the appropriate utilization circuitry, not shown. It is understood that other circuit elements would be employed in a practical realization of such a receiver, but for the sake of clarity have been omitted in the circuit of FIG. 1.

In operation, the input signal to the dual channel receiver of FIG. 1 is split into two channels. The local oscillator output is also split into two channels one of which is phase-shifted by 90° with respect to the local oscillator signal in the other channel. The input signals in the two signal channels are synchronously detected with respect to the two phase quadrature components of the local oscillator signal. The output of synchronous detector 10 constitutes the quadrature component of the detected input signal and this channel is therefore known as the quadrature of "Q Channel". The output from synchronous detector 11, on the other hand, contains the in-phase component of the detected input signal and is therefore referred to as the "I Channel".

The Q and I Channel outputs of synchronous detectors 10 and 11 are then amplified in bandpass amplifiers 14 and 15, respectively. The error signal for the Costas phase-locked receiver of FIG. 1 is obtained by cross-correlating the two quadrature signals in video correlator 16. This error signal from video correlator 16 is filtered appropriately and fed back through frequency control circuit 17 to control the frequency and phase of local oscillator 12.

Video amplifiers 14 and 15 are included to emphasize the fact that additional gain is often required following the synchronous detectors. In addition, frequency sensitive networks may be incorporated in the amplifiers to limit the bandwidths of the detector output signals prior to their correlation at video correlator 16. As noted hereinabove, the video output from the receiver is obtained from the I Channel at the output of video amplifier 15.

The dual channel Costas receiver depicted in FIG. 1 is designed to function with suppressed carrier AM signals. It is also operational when the carrier of the received signal is not suppressed, but its primary function is for synchronous detection of suppressed carrier AM signals.

The successful operation of the Costas receiver of FIG. 1 depends upon the maintenance of the phase quadrature relationship between the local oscillator and signal components at synchronous detectors 10 and 11. At the lower radio frequencies and even at microwave frequencies, it is relatively straight-forward task to maintain the required phase relationships. This is so because the lengths of the various transmission lines coupling the input signal components and the local oscillator components to the synchronous detectors can be maintained with very tight tolerances in relation to the wavelengths of rf signals. At optical wavelengths, however, it is much more difficult to maintain the desired phase quadrature relationship. At optical frequencies, the wavelengths are measured in terms of microns rather than in terms of meters, centimeters, and millimeters. It is apparent, therefore, that in order to adapt a Costas receiver such as that depicted in FIG. 1 to the reception of signals at optical wavelengths, more is required than a one-for-one parts substitution.

Figure 2:
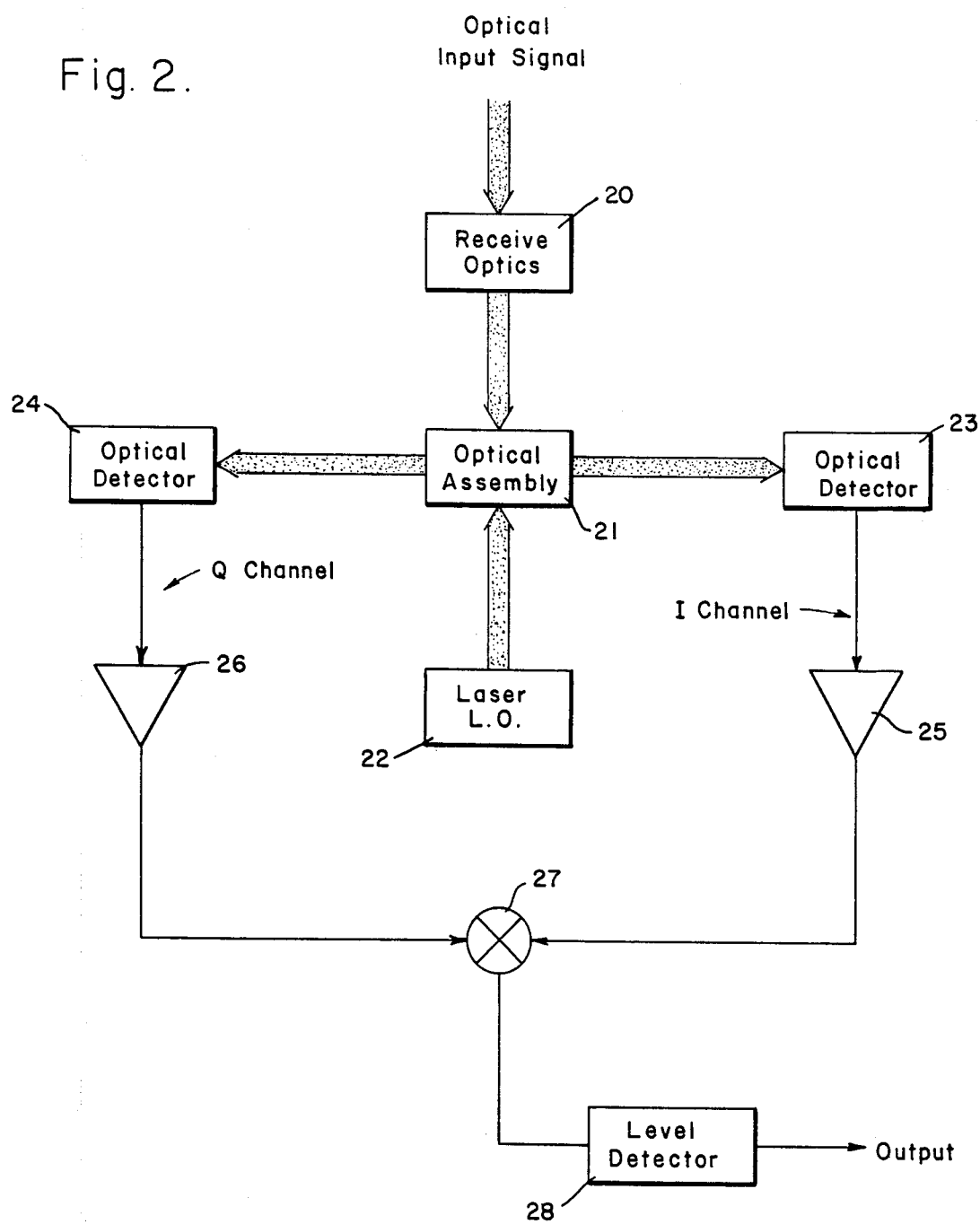
FIG. 2 is a block diagram of a preferred embodiment of the present invention.

In FIG. 2 there is shown a block diagram of a dual channel optical homodyne receiver in keeping with a preferred embodiment of the present invention. The input signal in the form of a modulated beam of coherent light enters the receiver by means of receive optics 20. The receive optics typically include a telescope or other beam collimating means and, where appropriate, electromechanical scanning, beam directing and filtering means. The input beam thus received is directed to one input of a composite optical assembly 21. The output beam from a stabilized laser local oscillator 22 is also coupled into optical assembly 21. Composite optical assembly 21 will be described in greater detail in connection with FIG. 3 hereinbelow. At this point, however, it is sufficient to state that composite optical assembly 21 accepts the input and the local oscillator beams and couples portions of these beams each to the inputs of optical detectors 23 and 24. Composite optical assembly 21 operates in such a way that the local oscillator and signal carrier components in the two output beams (i.e., the input beams to optical detectors 23 and 24) have the correct phase relationships and magnitudes. Preferably, the distribution of the signal energy between the two channels in the present invention is equal.

In keeping with the previously adopted terminology, the output of the I Channel optical detector 23 is coupled to the input of squaring amplifier 25. Similarly, the output of the Q Channel optical detector 24 is coupled to the input of squaring amplifier 26. The outputs of squaring amplifiers 25 and 26 are, in turn, coupled to the two inputs of summing network 27. If a pulse code modulation format is utilized, the output of summing network 27 can be coupled to a level detector 28, as shown, and then to appropriate decoding and processing apparatus, not shown.

In modern laser communications systems, the received signal can comprise an optical carrier modulated by information-bearing modulation components extending over many tens or hundreds of megahertz. A preferred modulation format for which the present invention is well adapted is wideband communications and especially to data communication using pulse code modulation. It may be assumed in connection with the embodiment of FIG. 2 that the optical wavelength of the input signal beam is in the region of 10.6 microns. This corresponds, of course, to a preferred transition of the $CO_2$ laser which, as noted above, is commonly employed in such communications systems. It is to be understood, however, that the choice of such an operating wavelength is merely exemplary and that other lasers operating on other wavelengths can be used with suitable modifications to the components of the described embodiment. In describing the operation of the embodiment of FIG. 2, it is also assumed that the input signal beam is circularly polarized. Again, circular polarization of the input beam is not necessary but merely exemplary. Linear polarization or elliptical polarization may also be employed with rather minor modifications to the described embodiment.

In operation, the input signal beam is passed through the receive optics 20 and into composite optical assembly 21. Optical assembly 21 splits the incoming beam into two components, one of which is directed to the photodetecting surface of optical detector 23 and the other component to the photodetecting surface of optical detector 24. The ratio of the input signal powers directed to the two optical detectors is preferably equal, with provisions being made in the composite optical assembly for maintaining this equality as discussed hereinbelow.

The local oscillator beam generated by stabilized laser local oscillator 22 is also coupled into composite optical assembly 21 where it is split into two components. One of the local oscillator components is spatially aligned with one portion of the input signal beam and directed to optical detector 23. The other portion of the local oscillator beam is shifted in phase by 90 electrical degrees and combined with the other portion of the input signal beam where it is spatially directed to optical detector 24. Therefore, the input signal to each optical detector is the superposition of a portion of the received signal beam and a portion of the local oscillator beam. The action of optical assembly 21 is to assure that the phase of the local oscillator beam in the input to optical detector 24 lags or leads the phase of the signal carrier by 90 degrees more than the corresponding phase difference between the local oscillator beam and the signal carrier beam in the input to optical detector 23. When these two beams are optically well aligned, interference takes place on the photodetecting surfaces of optical detectors 23 and 24 to produce the I Channel and Q Channel video outputs, respectively. The I Channel and Q Channel signals are then amplified by squaring amplifiers 25 and 26 and added in summing network 27.

The output signal from optical detector 24 is given by the relationship:

$$S_1 = AB \cos(\omega_S t - \omega_L t - \pi/2) = AB \sin(\omega_S - \omega_L)t \quad (1)$$

where $A$ and $B$ represent the amplitudes of the signal and local oscillator contributions respectively. The terms $\omega_S$ and $\omega_L$ represent the frequencies of the input signal and local oscillator signal respectively. The output signal from optical detector 23 is given by the expression:

$$S_2 = AB \cos(\omega_S - \omega_L)t \quad (2)$$

The two signals when squared and added become:

$$S_1^2 + S_2^2 = A^2B^2[\sin^2(\omega_S - \omega_L)t + \cos^2(\omega_S - \omega_L)t] \quad (3)$$

and since,
$$\sin^2\phi + \cos^2\phi = 1 \quad (4)$$

equation [3] becomes:

$$S_1^2 + S_2^2 = A^2B^2 \quad (5)$$

The output from summing network 27 is therefore equal to $A^2B^2$. Since the amplitude (B) of the local oscillator is substantially invariant, the signal at this point is proportional to the square of the modulation signal amplitude. Further, it is seen that it is not necessary that the frequencies of the input and local oscillator signals be the same. It is sufficient that they be stabilized to the same nominal frequency. The amount of frequency offset between the signal $\omega_S$ and the local oscillator $\omega_L$ which can be tolerated depends on the passband characteristics of the detectors and the amplifiers. In general, the net bandwidth of the detector and amplifier must be greater than the communication data bandwidth plus the offset frequency.

As mentioned hereinabove, at optical wavelengths it is not feasible to control the lengths of separate optical paths to the required tolerances which assure that the components of the signal and the local oscillator beams at the optical detectors will have the precise phase relationships required. The composite optical assembly 21, however, first combines the local oscillator and the signal beams and then processes the combined beams to produce two output beams having the desired magnitudes and phases.

Figure 3:
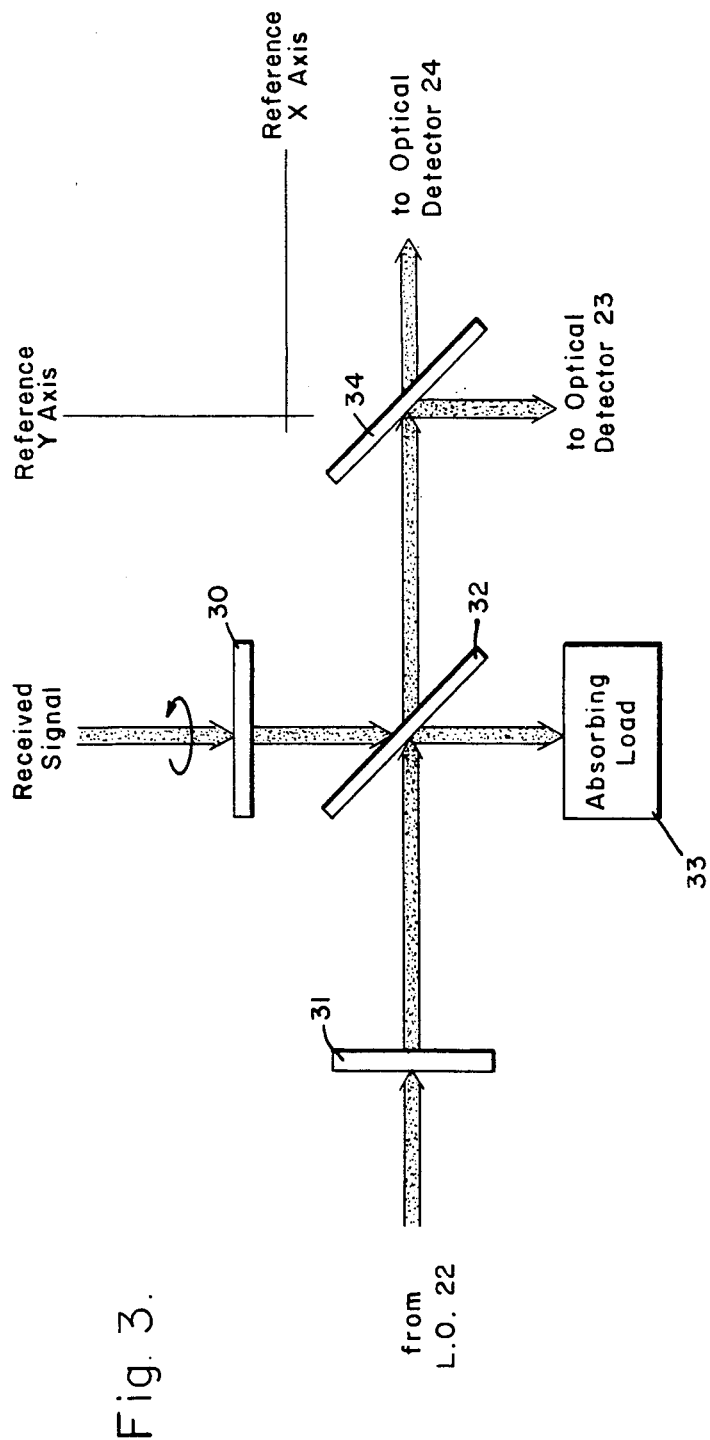
FIG. 3 is a block diagram of a composite beam-splitting/phase-splitting optical assembly useful in practicing the embodiment of FIG. 2.

In FIG. 3, therefore, there is shown schematically the details of the composite optical assembly 21 employed in the embodiment of FIG. 2. This assembly comprises a first quarter-wave plate 30 disposed in the path of the input signal beam from receive optics 20. Quarter-wave plate 30 is adapted for rotation about an axis substantially parallel to the input signal beam as indicated by the small arrow. A second quarter-wave plate 31 is disposed in the optical path of the local oscillator beam from tunable local oscillator 22. A beam combiner 32 is provided at the intersection of the received signal and local oscillator beams. An absorbing optical load 33 is provided to serve as an absorbent termination for the excess local oscillator beam reflected from beam combiner 32 and for the minor portion of the input signal beam transmitted through beam combiner 32. Ideally, of course, it is desirable that all of the input signal beam incident upon beam combiner 32 be reflected and none transmitted to optical load 33. However, some input signal power must be lost in this way in order to couple a portion of the local oscillator output into a common path with the reciver signal. Disposed in the optical path at the output side of beam combiner 32 is a polarization beam splitter 34.

In operation, the received beam from receive optics 20 enters the composite optical assembly and passes through rotatable quarter-wave plate 30. As mentioned hereinabove, the input signal beam is preferably circularly polarized. While this is not necessary, the use of circular polarization in modern optical communications systems offers several advantages and is commonly used. However, if linear or elliptical polarization is employed, rather minor modifications can be made to accommodate the noncircular polarization vector. The action of quarter-wave plate 30 is to convert the circularly polarized input beam into a linearly polarized beam of preferred orientation. The rotation of the quarter-wave plate 30 about the beam axis rotates the so-called "fast" and "slow" optical axes of the plate and hence provides rotation of the plane of polarization of the linearly polarized signal beam emerging therefrom.

The beam from tunable laser local oscillator 22, which in the present embodiment is linearly polarized, is directed through the second quarter-wave plate 31 where it is converted to a circularly polarized beam. The received signal beam and the local oscillator beam are then combined in beam combiner 32. Beam combiner 32 can comprise, for example, a partially reflecting germanium mirror. The action of the beam combiner 32 is to reflect the greater portion of the received signal beam toward polarization beam splitter 34 and to reflect the greater portion of the local oscillator beam into the absorbing optical load 33. Of course, a small portion of the received signal beam will be transmitted through the beam combiner 32 and absorbed in load 33. Similarly, a small portion of the local oscillator beam will be transmitted through beam combiner 32 toward polarization beam splitter 34.

The reason for the unequal division of power of the received signal beam and the local osillator beam is to assure that substantially all of the received signal power is reflected toward polarization beam splitter 34 and then to the optical detectors 23 and 24. Because of the nature of beam combiner 32, the penalty for reflecting most of the received signal power is that most of the local oscillator beam power is reflected into absorbing load 33 where it is dissipated. However, since adequate local oscillator power is available, this power loss is of minimal concern. In practice, on the order of 95% of the signal power and 5% of the local oscillator power would be combined and directed toward polarization beam splitter 34.

At the output of beam combiner 32, there is a superposition of the linearly polarized received signal and the circularly polarized local oscillator signal. The loci of the electric field vectors of these two signal components are depicted graphically in FIGS. 4a and 4b respectively. The axially aligned superimposed beams thereafter impinge on polarization beam splitter 34. Polarization beam splitter 34 can comprise, for example, a wire grid polarizer well known in the optical art. The devices presently available in the 10.6 micron region of present interest permit polarization action with less than 10% reflection loss and less than 5% transmission loss.

Polarization beam splitter 34 is oriented so that those components whose electric field vectors are oriented in the x direction are reflected to optical detector 23. The components polarized in the y direction (that is, those components whose electric field vectors are oriented in the y direction) are passed through polarization beam splitter 34 to optical detector 24. Thus, the component of the linearly polarized received signal in FIG. 4a which lies along the horizontal x axis is reflected to optical detector 23 while the component of the received signal which lies along the vertical y axis is transmitted to optical detector 24; alternatively, the positions of detectors 23 and 24 could be interchanged if quarter-wave plate 30 were rotated to provide the desired power split.

Figure 4B:
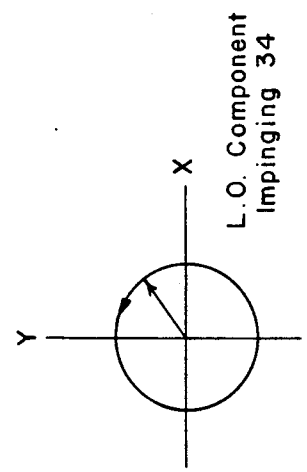
FIGS. 4(a) and 4(b) are diagrams illustrating the relationship between the polarized beams in the optical assembly of FIG. 3.
Figure 4A:
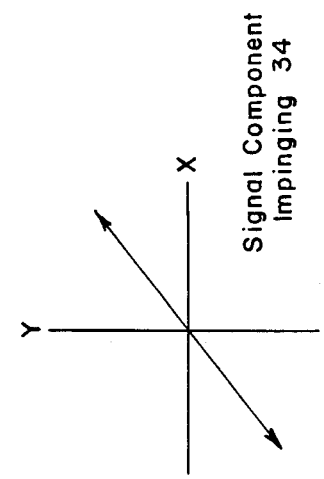

The circularly polarized local oscillator beam, as is well known, may be viewed as comprising a pair of orthogonal linearly polarized components along the x and y axes of the polarization beam splitter. When so viewed and when the sense of circular polarization is as indicated in FIG. 4b, the y component of the field vector leads the x component of the field vector by 90°. That is, the x and y components of the field vector are not only orthogonal in space but the x component considered as a function of time (that is considered with regard to phase) lags the y component by one-quarter cycle or 90°. As a consequence, the phase relationships between the local oscillator and signal carrier components in the two beams emerging from polarization beam splitter 34 are identical except for an additional 90° phase lead of the local oscillator signal in the beam transmitted to the quadrature optical detector 24 relative to the received signal carrier reflected to the in phase optical detector 23. This is precisely the phase relationship that the composite optical assembly is required to establish for the implementation of the dual channel receiver of FIG. 2.

By rotating quarter-wave plate 30 about the axis of the input signal beam, the orientation of the plane of polarization of the received signal relative to the optical axis of the polarization beam splitter 34 can be varied. That is, the orientation of the electric field vector depicted in FIG. 4a can be varied. By varying this angle, the x and y components of the signal can be apportioned in the desired amounts at the two optical detectors without affecting the desired phase relationships. For complete cancellation of the $(\omega_S - \omega_2)$ component from the output signal the power division should be made equal.

Because all of the signal modulation components are transmitted through both channels, it is necessary that optical detectors 23 and 24 and squaring amplifiers 25 and 26 have response characteristics which are matched over the frequency range of operation. For satisfactory operation it is necessary, moreover, to provide a low frequency cutoff in the two parallel channels to suppress the DC and other undersirable low-frequency components. These components include the so-called "$1/f$ noise" and the local oscillator-cross-local oscillator products. At the same time, the low-frequency cutoff should be sufficiently low to pass the significant frequency components of the signal modulation.

For the sake of simplicity, the automatic gain control circuitry has been omitted from the embodiment of FIG. 2. It is apparent that AGC is desirable for optimum receiver performance. Again, AGC circuits are well known in the art and need not be described herein. It is noted that, if desired, a single AGC voltage derived from the signal in the I Channel could be employed to control the gain of both squaring amplifiers 25 and 26.

In all cases, it is understood that the above described embodiment is illustrative of but one of the many possible specific embodiments which can represent applications of the principles of the present invention. Numerous and varied other arrangements can be readily devised in accordance with these principles by those skilled in the art without departing from the spirit and scope of the invention.

What is claimed is:

1. An optical homodyne receiver comprising, in combination:
    optical input means for receiving an input signal, said input signal being characterized by a carrier frequency and information-containing modulation components;
    a laser oscillator for generating a local oscillator signal having substantially the same frequency as said carrier frequency;
    an optical assembly coupled to said optical input means and to said laser oscillator, said optical assembly being capable of combining a first portion of said input signal with a first portion of said local oscillator signal and a second portion of said input signal with a second portion of said local oscillator signal, the phase difference between the first portion of said local oscillator signal and the carrier of the first portion of said input signal differing by substantially 90 degrees from the phase difference between the second portion of said local oscillator signal and the carrier of the second portion of said input signal;
    a first optical detector coupled to said optical assembly for detecting the first portion of said input signal with respect to the first portion of said local oscillator signal to produce a first video signal;
    a second optical detector coupled to said optical assembly for detecting the second portion of said input signal with respect to the second portion of said local oscillator signal to produce a second video signal;
    means coupled to said first optical detector for squaring said first video signal;
    means coupled to said second optical detector for squaring said second video signal;
    summing means for combining said first and second squared video signals; and
    means for deriving an output signal from said summing means.

2. The receiver according to claim 1 wherein said first and second squaring means comprise squaring amplifiers.

3. The receiver according to claim 1 wherein said first portion of said input signal is substantially equal in magnitude to said second portion of said input signal.

4. The receiver according to claim 1 wherein said means for deriving an output signal comprises a level detector.

5. The receiver according to claim 1 wherein said optical assembly comprises, in combination:
    a first optical quarter-wave plate;
    a second optical quarter-wave plate;
    an optical beam combiner coupled to said first and second quarter-wave plates; and
    a polarization beam splitter coupled to said beam combiner.

6. The receiver according to claim 5 wherein said first optical quarter-wave plate is adapted for rotation about an axis substantially parallel to its optical axis.

7. An optical homodyne receiver comprising, in combination:
    first and second optical detectors each having an optical input and a video output;
    an optical input signal;
    a laser oscillator for generating a local oscillator signal;
    an optical assembly coupling said local oscillator signal and said input signal to said first and second optical detectors in adjustable proportions, the portions of said local oscillator signals coupled to said first and second optical detectors differing by substantially 90° with respect to the carrier of said input signal at the optical inputs of said first and second optical detectors;
    a summing network having at least two inputs and an output;
    first and second signal squaring means for coupling the outputs of said optical detectors to the inputs of said summing network; and
    means for deriving an output signal from the output of said summing network.

8. The receiver according to claim 7 wherein said first and second squaring means comprise squaring amplifiers.

9. The receiver according to claim 7 wherein said means for deriving an output signal comprises a level detector.

10. The receiver according to claim 7 wherein said optical assembly comprises in combination:
    a first optical quarter-wave plate;
    a second optical quarter-wave plate;
    an optical beam combiner coupled to said first and second quarter-wave plates; and
    a polarization beam splitter coupled to said beam combiner.

11. The receiver according to claim 10 wherein said first optical quarter-wave plate is adapted for rotation about an axis substantially parallel to its optical axis.

* * * * *